United States Patent
Park et al.

(10) Patent No.: US 10,135,578 B2
(45) Date of Patent: Nov. 20, 2018

(54) METHOD OF RE-TRANSMITTING DATA AND ELECTRONIC DEVICE THEREFOR

(71) Applicant: ELECTRONICS AND TELECOMMUNICATIONS RESEARCH INSTITUTE, Daejeon (KR)

(72) Inventors: Hyun Seo Park, Daejeon (KR); Yong Seouk Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 153 days.

(21) Appl. No.: 14/982,122

(22) Filed: Dec. 29, 2015

(65) Prior Publication Data

US 2016/0191212 A1 Jun. 30, 2016

(30) Foreign Application Priority Data

Dec. 30, 2014 (KR) .................... 10-2014-0194067
Nov. 18, 2015 (KR) .................... 10-2015-0161894

(51) Int. Cl.
*H04L 1/18* (2006.01)

(52) U.S. Cl.
CPC .......... *H04L 1/1816* (2013.01); *H04L 1/1877* (2013.01); *H04L 1/1848* (2013.01)

(58) Field of Classification Search
CPC ............................ H04L 1/1816; H04L 1/1877
See application file for complete search history.

(56) References Cited

U.S. PATENT DOCUMENTS

| | | | |
|---|---|---|---|
| 2007/0168826 A1* | 7/2007 | Terry | H04L 1/1812 714/748 |
| 2007/0245201 A1* | 10/2007 | Sammour | H04L 1/1628 714/748 |
| 2008/0101312 A1 | 5/2008 | Suzuki et al. | |
| 2010/0115362 A1 | 5/2010 | Kim et al. | |
| 2010/0138713 A1 | 6/2010 | Hong et al. | |
| 2011/0093757 A1* | 4/2011 | Seol | H04L 1/1812 714/749 |
| 2013/0021982 A1 | 1/2013 | Kim et al. | |

FOREIGN PATENT DOCUMENTS

| | | |
|---|---|---|
| KR | 10-0849323 B1 | 7/2008 |
| KR | 10-2011-0112015 A | 10/2011 |

* cited by examiner

*Primary Examiner* — Albert T Chou
(74) *Attorney, Agent, or Firm* — Rabin & Berdo, P.C.

(57) ABSTRACT

Disclosed is a first electronic device and the first electronic device includes: a transmitter transmitting data to a second electronic device; a receiver receiving a feed-back (hereinafter, referred to as a first feed-back) for the transmitted data from the second electronic device; and a processor deciding whether to transmit the data again or another data to the second electronic device, based on the first feed-back, in which when the first feed-back is negative, the transmitter retransmits the data under a predetermined condition, and when a feed-back (hereinafter, referred to as a second feed-back) received from the second electronic device is negative with respect to the data retransmitted under the predetermined condition, the transmitter re-retransmits at least a part of the data to the second electronic device.

9 Claims, 7 Drawing Sheets

METHOD OF RE-TRANSMITTING DATA AND ELECTRONIC DEVICE THEREFOR

CROSS-REFERENCE TO RELATED APPLICATIONS

This application claims priority to and the benefit of Korean Patent Application No. 10-2014-0194067 filed in the Korean Intellectual Property Office on Dec. 30, 2014 and No. 10-2015-0161894 filed in the Korean Intellectual Property Office on Nov. 18, 2015 the entire contents of which are incorporated herein by reference.

TECHNICAL FIELD

The present invention relates to a method of re-transmitting data and an electronic device for performing the method when data re-transmission is required according to a data transmission result in a mobile communication system.

Particularly, the present invention relates to a method and an electronic device of acquiring an ARQ retransmission effect by performing HARQ transmission by collecting data required to be re-transmitted when ARQ re-transmission is required according to an HARQ transmission result in a mobile communication system.

BACKGROUND ART

All over the world, an LTE mobile communication system is commercialized to provide a service.

In LTE, an HARQ and an ARQ are independently operated in order to recover an error which occurs when a terminal and a base station transmit data. The HARQ operates in an N-process stop-and-wait ARQ scheme. When a transmitter side receives a feed-back representing that the transmitter side transmits data with respect to one HARQ process and normally receives data from a receiver side (HARQ ACK), the transmitter side transmits next data. Otherwise, when the transmitter side receives a feed-back that an error occurs in the data received from the receiver side (HARQ NACK), the transmitter side re-transmits the corresponding data. The HARQ is used by defining the maximum number of transmission times. When the error continuously occurs for the maximum number of HARQ transmission times or when the feed-back is the HARQ-NACK, but an NACK-to-ACK error occurs, and as a result, when the HARQ NACK feed-back is mis-interpreted as HARQ ACK feed-back, data is lost.

When the data loss exerts a fatal influence on performance like TCP application, the data loss is recovered through ARQ retransmission in order to reduce a data loss ratio. The ARQ retransmission operates in a selective repeat ARQ scheme. In general, the receiver side starts a timer when the data loss is detected. A timer value is set to a time considering the maximum number of HARQ transmission times to recover the data loss through the HARQ retransmission. When the timer expires, the receiver side may report data receiving status information to the transmitter side and the status information includes lost data information, and as a result, the transmitter side may retransmit only the lost data.

In the LTE, the HARQ and the ARQ operate independently from each other, and as a result, the ARQ retransmission is performed later than the time of the data loss due to the timer value set to the time considering the maximum number of HARQ transmission times and a time when the receiver side transmits the data receiving status information to the transmitter side.

SUMMARY OF THE INVENTION

The present invention has been made in an effort to provide a method of re-transmitting data and an electronic device for performing the method when data re-transmission is required according to a data transmission result in a mobile communication system.

Particularly, the present invention has been made in an effort to provide a method of acquiring an ARQ retransmission effect by performing HARQ transmission by collecting data required to be re-transmitted when ARQ re-transmission is required according to an HARQ transmission result in a mobile communication system and a device thereof.

The objects of the present invention are not limited to the aforementioned objects, and other objects, which are not mentioned above, will be apparent to a person having ordinary skill in the art from the following description.

An exemplary embodiment of the present invention provides a first electronic device including: a transmitter transmitting data to a second electronic device; a receiver receiving a feed-back (hereinafter, referred to as a first feed-back) for the transmitted data from the second electronic device; and a processor deciding whether to transmit the data again or another data to the second electronic device, based on the first feed-back.

When the first feed-back is negative, the transmitter retransmits the data under a predetermined condition, and when a feed-back (hereinafter, referred to as a second feed-back) received from the second electronic device is negative with respect to the data retransmitted under the predetermined condition, the transmitter re-retransmits at least a part of the data to the second electronic device.

In an operation of re-retransmitting the data, the data may be ARQ-retransmitted through HARQ initial transmission.

Under the predetermined condition, the maximum number of retransmission times may be set, and the second feed-back may include a negative feed-back as many as the set maximum number of retransmission times.

When the receiver receives the negative feed-back for the case of retransmitting the data at the number of times less than the maximum number of retransmission times, the processor may HARQ-retransmit the data to the second electronic device.

The data may include a plurality of data packets, and one or more data packets receiving the negative feed-back among the transmitted data or the retransmitted data may be targets of the data retransmission.

The second electronic device may not start an ARQ retransmission timer based on the first feed-back.

When the received first feed-back is negative and the processor misinterprets the first feed-back, the transmitter may transmit another data to the second electronic device, and the receiver may receive a data transmission error announcement from the second electronic device.

In response to the data transmission error announcement, the transmitter may ARQ-retransmit the data through a HARQ initial transmission.

The second electronic device may not start the ARQ retransmission timer based on the data transmission error announcement.

Another exemplary embodiment of the present invention provides a method performed by a first electronic device, including: an operation of transmitting data to a second electronic device; an operation of receiving a feed-back (hereinafter, referred to as a first feed-back) for the transmitted data from the second electronic device; an operation of deciding whether to transmit the data again or another data to the second electronic device, based on the first feed-back; an operation of retransmitting the data under a predetermined condition when the first feed-back is negative; and an operation of re-retransmitting, when a feed-back (hereinafter, referred to as a second feed-back) received from the second electronic device is negative with respect to the data retransmitted under the predetermined condition, at least a part of the data to the second electronic device.

The method may further include: an operation of misinterpreting the received first negative feed-back as positive feed-back; an operation of transmitting another data to the second electronic device; an operation of receiving a data transmission error announcement from the second electronic device; and an operation of retransmitting the data in response to the data transmission error announcement.

According to exemplary embodiments of the present invention, when retransmission is required according to a data transmission result to a second electronic device, a first electronic device can rapidly cope with the data transmission result by retransmitting the data without waiting for a receiving status information from the second electronic device.

Particularly, an ARQ retransmission effect can be acquired by performing HARQ transmission by collecting data required to be re-transmitted when ARQ re-transmission is required according to an HARQ transmission result. When an error continuously occurs for the maximum number of HARQ transmission times, the first electronic device collects the data required to be ARQ-retransmitted among the data included in the HARQ transmission to immediately perform the HARQ transmission, thereby acquiring an effect of performing the ARQ retransmission (performing the HARQ transmission immediately when it may be verified that the data loss may not be recovered). When the NACK-to-ACK error occurs in the first electronic device, the second electronic device detects the NACK-to-ACK error and reports the detected NACK-to-ACK error to the first electronic device and when the NACK-to-ACK error occurs, the data required to be ARQ-retransmitted among the data included in the previous HARQ transmission are collected to be immediately HARQ-transmitted, thereby acquiring an effect of performing the ARQ retransmission.

Since performance of a TCP application is inversely proportional to RTT, when ARQ retransmission is delayed, the performance of the TCP application deteriorates. Accordingly, an object of various exemplary embodiments of the present invention is to improve communication quality by performing the HARQ retransmission as fast as possible.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

Figure 1:
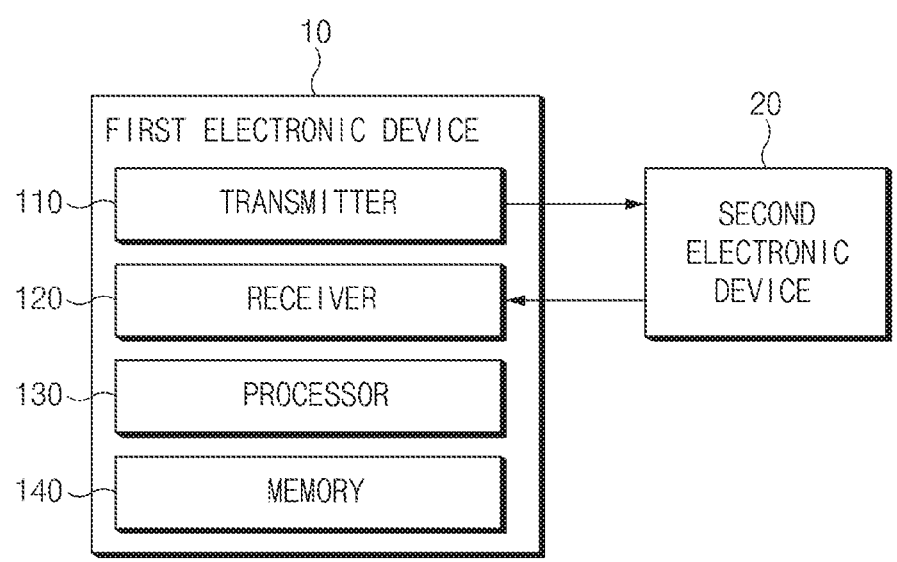
FIG. 1 is a configuration diagram of a first electronic device according to various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, the present invention will be described in detail with reference to the accompanying drawings. When reference numerals refer to components of each drawing, it is noted that although the same components are illustrated in different drawings, the same components are referred to by the same reference numerals as possible. Further, a detailed description of an already known function and/or configuration will be skipped. In contents disclosed hereinbelow, a part required for understanding an operation according to various exemplary embodiments will be described in priority and a description of elements which may obscure the spirit of the present invention will be skipped. Further, some components of the drawings may be enlarged, omitted, or schematically illustrated. An actual size is not fully reflected on the size of each component and therefore, contents disclosed herein are not limited by relative sizes or intervals of the components drawn in the respective drawings.

FIG. 1 is a configuration diagram of a first electronic device according to various exemplary embodiments of the present invention. Referring to FIG. 1, the first electronic device 10 may include a transmitter 110, a receiver 120, a processor 130, and a memory 140.

The constitution of the first electronic device 10 illustrated in FIG. 1 is just one implementation example of the present invention and may be variously modified. For example, the first electronic device 10 may further include a user interface for receiving any command or information from a user. In this case, the user interface may be generally an input device such as a keyboard, a mouse, or the like, but a graphical user interface (GUI) displayed on a screen of the first electronic device 100.

The transmitter 110 may transmit data to a second electronic device 20. In the case of the data, one content may be divided into a plurality of data. Therefore, the transmitter 110 may transmit the data to the second electronic device 20 and thereafter, also transmit another data to the second electronic device 20. The data transmitting operation may be repeatedly performed until all of the contents are transmitted to the second electronic device 20.

The receiver 120 may receive a feed-back for the transmitted data from the second electronic device 20. The feed-back may include whether the second electronic device 20 successfully receives the data or whether the second electronic device 20 unsuccessfully receives the data. According to various exemplary embodiments of the present invention, when the feed-back is negative, the second electronic device 20 may not start an ARQ retransmission timer based on the negative feed-back.

The processor 130 may be implemented as, for example, a system on chip (SoC) and include one or more among a central processing unit (CPU), a graphic processing unit (GPU), an image signal processor, an application processor (AP), and a communication processor (CP). The processor 130 may load and process a command or data received from at least one among other components (for example, the transmitter 110 and the receiver 120) from the memory 140 and store various data in the memory 140.

As described above, the operation in which the transmitter 110 transmits the data to the second electronic device 20 and the operation in which the receiver 120 receives the feed-back from the second electronic device 20 may be performed by the processor 130.

The processor 130 may decide whether to transmit the data transmitted to the second electronic device 20 again or whether to transmit another data based on the feed-back.

For example, when the feed-back is positive (for example, HARQ ACK), the processor 130 may allow the transmitter 110 to transmit another data to the second electronic device 20. Further, when the feed-back is negative (for example, HARQ NACK), the processor 130 may allow the transmitter 110 to retransmit the transmitted data to the second electronic device 20.

According to various exemplary embodiments of the present invention, the processor 130 may allow the transmitter 110 to retransmit the transmitted data to the second electronic device 20 under a predetermined condition. Under the predetermined condition, the maximum number of retransmission times may be set.

When the receiver 120 receives the negative feed-back for the retransmitted data, the processor 130 may allow the transmitter 110 to re-retransmit the retransmitted data to the second electronic device 20 again. The negative feed-back for the retransmitted data may be received as many as the set maximum number of retransmission times.

When the negative feed-back for the retransmitted data is received for the number of times less than the predetermined maximum number of retransmission times, the data may be HARQ-retransmitted to the second electronic device 20.

When the negative feed-back for the retransmitted data is received for the predetermined maximum number of retransmission times, the data may be retransmitted to the second electronic device 20 through the HARQ initial transmission.

According to various exemplary embodiments of the present invention, the data may include a plurality of data packets. One or more data packets receiving the negative feed-back among the transmitted data or the retransmitted data may need the data re-retransmission.

According to various exemplary embodiments of the present invention, although the feed-back received from the second electronic device 20 is the negative feed-back, the processor 130 may misinterpret the negative feed-back as the positive feed-back (for example, NACK to ACK error). In this case, the processor 130 may allow the transmitter 110 to transmit another message to the second electronic device 20. The second electronic device 20 that receives another message transmits the negative feed-back to the first electronic device 10, but the second electronic device 20 receives another data, and as a result, the second electronic device 20 may report that a data transmission error (for example, the NACK to ACK error) occurs in the first electronic device 10.

According to various exemplary embodiments of the present invention, the second electronic device 20 may not start the ARQ retransmission timer based on the data transmission error announcement.

The receiver 110 may receive the data transmission error announcement and the processor 130 may retransmit the data to the second electronic device 20 in response to the announced data transmission error.

The memory 140 may store data, for example, instructions for operations performed by the processor 130. In this case, the data stored in the memory 140 may include data input and output among the respective components in the electronic device 10 and include data input and output among the electronic device 10 and the components outside the electronic device 10. For example, the memory 140 may store information on an unlock solution set by a user. Further, the memory 140 may store data regarding a plurality of applications installed in the electronic device 10 and store execution frequencies of the plurality of respective applications.

The memory 140 may include an embedded memory or an exterior memory. The embedded memory may include at least one of, for example, a volatile memory (e.g., dynamic RAM (DRAM), a static RAM (SRAM), or a synchronous dynamic RAM (SDRAM)), a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a flash memory (e.g., NAND flash), or a NOR flash), a hard disk drive (HDD), and a solid state drive (SSD).

The exterior memory may further include, for example, a flash drive, for example, compact flash (CF), secure digital (SD), a Micro-SD, a Mini-SD, extreme digital (xD), MultiMediaCard (MMC), or a memory stick. The exterior memory may be functionally and/or physically connected with the electronic device 10 through various interfaces.

Those skilled in the art will sufficiently understand that the transmitter 110, the receiver 120, the processor 130, and the memory 140 may be separately implemented in the electronic device 10 or one or more components among them are integrated and implemented.

Figure 2:
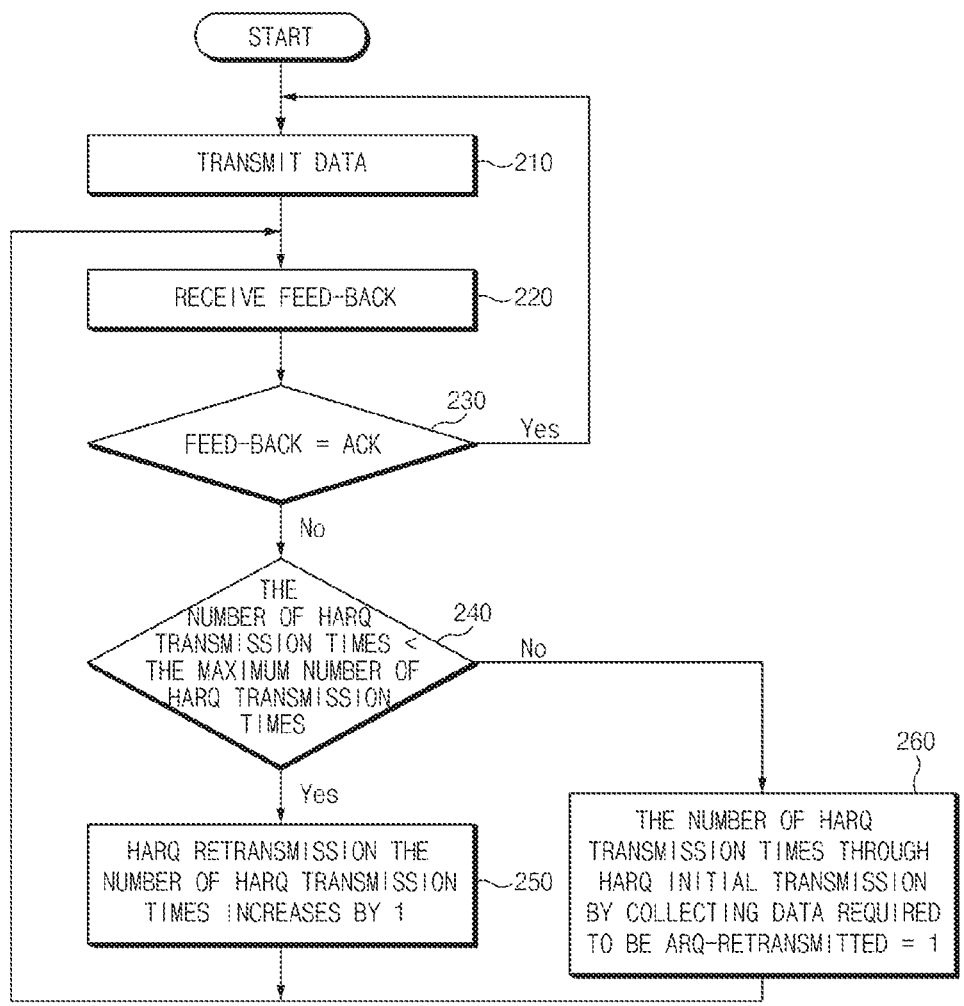
FIG. 2 is a flowchart illustrating a method in which a first electronic device re-transmits data to a second electronic device according to various exemplary embodiments of the present invention.

FIG. 2 is a flowchart illustrating a method in which a first electronic device re-transmits data to a second electronic device according to various exemplary embodiments of the present invention. The method of retransmitting data illustrated in FIG. 2 may be performed by the first electronic device 10 described through FIG. 1 given above. Therefore, in spite of the contents which are omitted below, the contents regarding the method in which the first electronic device 10 retransmits the data, which is described through FIG. 1 may be applied even to FIG. 2.

In operation 210, the first electronic device 10 may transmit the data to the second electronic device 20. The transmitted data may be one of a plurality of data included in contents to be transmitted to the second electronic device 20.

In operation 220, the first electronic device 10 may receive a feed-back of the second electronic device 20 for the data transmitted in operation 210 from the second electronic device 20. The feed-back may be a positive feed-back meaning that there is no problem in the data transmitted in operation 210 or a negative feed-back meaning that there is the error in the data transmitted in operation 210.

In operation 230, the first electronic device 10 may determine whether the feed-back received in operation 220 is the positive feed-back or the negative feed-back. When the feed-back received in operation 220 is the positive feed-back, operation 230 proceeds to operation 210 to transmit new data to the second electronic device 20. When the feed-back received in operation 20 is the negative feed-back, operation 230 may proceed to operation 240.

In operation 240, the first electronic device 10 may determine whether the number of HARQ transmission times is less than the maximum number of HARQ transmission times. When the number of HARQ transmission times is less than the maximum number of HARQ transmission times, operation 240 may proceed to operation 250 and if not, operation 240 may proceed to operation 260.

In operation 250, the first electronic device 10 may perform the HARQ retransmission and additionally count the number of HARQ transmission times by 1. Further, the first electronic device 10 may receive the feed-back for the HARQ retransmission performed in operation 250 (operation 220).

In operation 260, the first electronic device 10 collects data required to be ARQ-retransmitted to retransmit the data to the second electronic device 20 through the HARQ initial transmission. In this case, the number of HARQ transmission times may be 1. Further, operation 260 proceeds to operation 220 to receive the data transmitted in operation 260.

Figure 3:
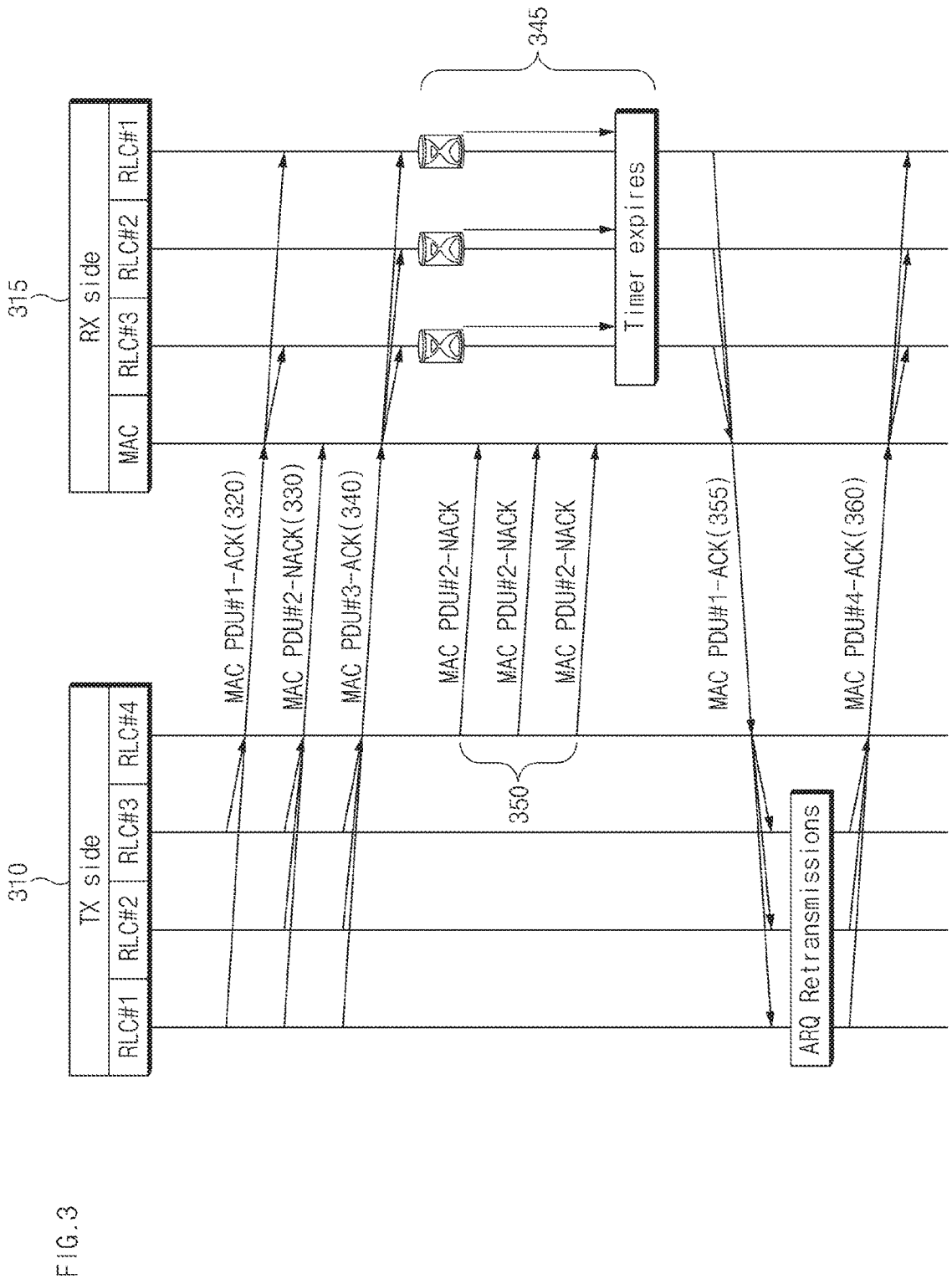
FIG. 3 is a flowchart illustrating a method in which ARQ retransmission is performed in a situation in which HARQ and ARQ operate independently from each other in an LTE system in the related art.

FIG. 3 is a flowchart illustrating a method in which ARQ retransmission is performed in a situation in which HARQ and ARQ operate independently from each other in an LTE system in the related art. In FIG. 3, it is assumed that three radio link control (RLC) entities are configured in each of a transmitter side 310 and a receiver side 315.

In operation 320, media access control (MAC) of the transmitter side 310 transmits to the receiver side 315 MAC PDU#1 obtained by multiplexing protocol data units (PDUs) of RLC#1 and RLC#3 and receives from the receiver side 315 an HARQ ACK feed-back announcing that the receiver side 315 normally receives MAC PDU#1. The MAC of the receiver side 315 de-multiplexes the received MAC PDU#1 to transfer each of the PDU of RLC#1 and the PDU of RLC#3 to the corresponding entity. In operation 330, the MAC of the transmitter side 310 transmits to the receiver side 315 MAC PDU#2 obtained by multiplexing PDUs of RLC#1, RLC#2, and RLC#3 and receives from the receiver side 315 an HARQ NACK feed-back announcing that an error occurs in MAC PDU#2 received by the receiver side 315.

In operation 340, the MAC of the transmitter side 310 transmits to the receiver side 315 MAC PDU#3 obtained by multiplexing the PDUs of RLC#1, RLC#2, and RLC#3 and receives the HARQ ACK feed-back from the receiver side 315. The MAC of the receiver side 315 de-multiplexes the MAC PDU#3 to transfer each of the PDUs of RLC#1, RLC#2, and RLC#3 to the corresponding entity.

In operation 345, the corresponding entities of RLC#1, RLC#2, and RLC#3 of the receiver side 315 discover the data loss and start the timer. The time of the timer is set to the time considering the maximum number of HARQ transmission times.

In operation 350, the MAC of the transmitter side 310 performs the HARQ retransmission of MAC PDU#2 receiving the HARQ NACK feed-back and receives the feed-back for the HARQ retransmission from the receiver side 315.

When the error continuously occurs for the maximum number of HARQ transmission times with respect to MAC PDU#2, the corresponding entities of RLC#1, RLC#2, and RLC#3 may not recover from the data loss, and as a result, the timer expires. In this case, in operation 355, each of the corresponding entities of RLC#1, RLC#2, and RLC#3 of the receiver side 315 reports data receiving status information to the transmitter side 310. The status information includes information on the lost data. It is assumed that the data receiving status information of each entity is transmitted while being multiplexed to MAC PDU#1 and the transmitter side 310 normally receives MAC PDU#1.

In operation 360, the corresponding entities of RLC#1, RLC#2, and RLC#3 of the transmitter side 310 perform the ARQ retransmission of the lost data based on the data receiving status information reporting of the receiver side 315. That is, the MAC of the transmitter side 310 transmits to the receiver side 315 MAC PDU#4 obtained by multiplexing the ARQ-retransmitted PDUs of RLC#1, RLC#2, and RLC#3 and receives the HARQ ACK feed-back from the receiver side 315. The MAC of the receiver side 315 de-multiplexes MAC PDU#4 to transfer each of the PDUs of RLC#1, RLC#2, and RLC#3 to the corresponding entity. Therefore, the data loss may be recovered.

When the HARQ and the ARQ operate independently from each other through such a procedure, as described above, the ARQ retransmission is performed later than the time of the data loss due to the timer value set to the time considering the maximum number of HARQ transmission times and a time when the receiver side 315 transmits the data receiving status information to the transmitter side 310 to respond to the data loss.

Figure 4:
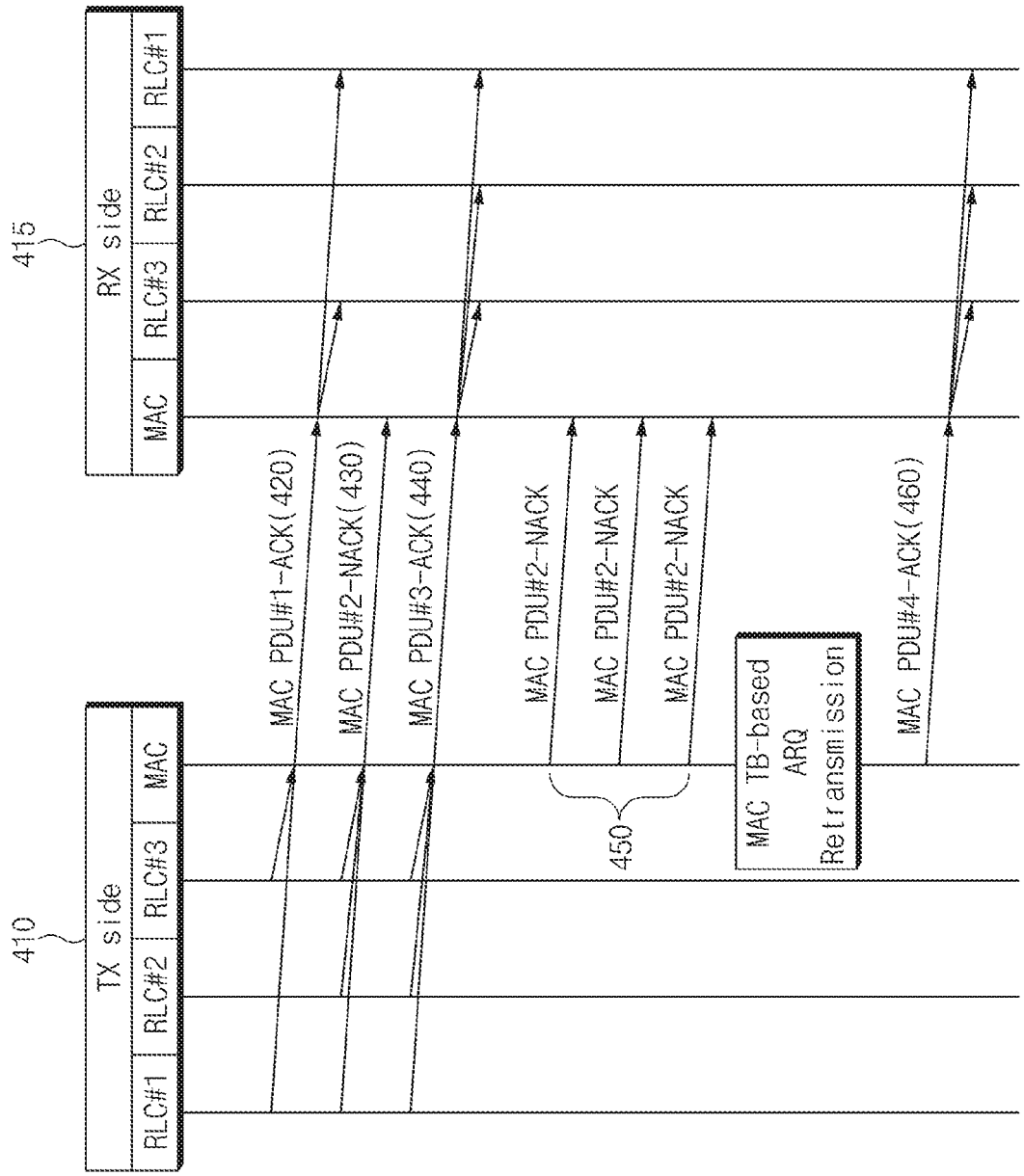
FIG. 4 is a flowchart illustrating a method in which when an error continuously occurs for the maximum number of HARQ transmission times, a first electronic device collects data required to be ARQ-retransmitted among data included in HARQ transmission to perform HARQ retransmission of the collected data according to various exemplary embodiments of the present invention.

FIG. 4 is a flowchart illustrating a method in which when an error continuously occurs for the maximum number of HARQ transmission times, a first electronic device collects data required to be ARQ-retransmitted among data included in HARQ transmission to perform HARQ retransmission of the collected data according to various exemplary embodiments of the present invention. The method of collecting the data required to be ARQ-retransmitted and retransmitting the collected data through the HARQ initial transmission, which is illustrated in FIG. 4 may be performed by the first electronic device 10 described through FIGS. 1 and 2 given above. Therefore, even though contents are omitted below, contents regarding the method in which the first electronic device 10 collects the data required to be ARQ-retransmitted and retransmits the collected data through the HARQ initial transmission, which is described through FIGS. 1 and 2 may be applied even to FIG. 4.

The first electronic device 10 of FIG. 1 may correspond to a transmitter side 410 and the second electronic device 20 may correspond to a receiver side 415. Further, a situation is assumed in which three RLC entities are configured in each of the transmitter side 410 and the receiver side 415.

In operation 420, MAC of the transmitter side 410 may transmit to the receiver side 415 MAC PDU#1 obtained by multiplexing PDUs of RLC#1 and RLC#3. The receiver side 415 normally receives MAC PDU#1 to feed back the HARQ ACK to the transmitter side 410. MAC of the receiver side 415 de-multiplexes the received MAC PDU#1 to transfer each of the PDUs of RLC#1 and RLC#3 to the corresponding entity.

In operation 430, the MAC of the transmitter side 410 may transmit to the receiver side 415 MAC PDU#2 obtained by multiplexing PDUs of RLC#1, RLC#2, and RLC#3. When a data error occurs in MAC PDU#2, the receiver side 415 may feed back the HARQ NACK to the transmitter side 410.

In operation 440, the MAC of the transmitter side 410 may transmit to the receiver side 415 MAC PDU#3 obtained by multiplexing the PDUs of RLC#1, RLC#2, and RLC#3. The receiver side 415 normally receives MAC PDU#3 to feed back the HARQ ACK to the transmitter side 410. The MAC of the receiver side 415 de-multiplexes MAC PDU#3 to transfer each of the PDUs of RLC#1, RLC#2, and RLC#3 to the corresponding entity.

The corresponding entities of RLC#1, RLC#2, and RLC#3 of the receiver side 415 discover the data loss in operation 430, but in various exemplary embodiments of the present invention, the timer may not be started.

In operation 450, the MAC of the transmitter side 410 may perform HARQ retransmission of MAC PDU#2 after receiving the HARQ NACK feed-back.

When the error continuously occurs for the maximum number of HARQ transmission times with respect to MAC PDU#2, in operation 460, the MAC of the transmitter side 410 may perform the ARQ retransmission at once with respect to a PDU required to be ARQ-retransmitted among RLC PDUs included in MAC PDU#2. For example, all of the entities of RLC#1, RLC#2, and RLC#3 require the ARQ retransmission, the transmitter side 410 may transmit to the receiver side 415 MAC PDU#4 obtained by multiplexing the RLC PDUs of the entities of RLC#1, RLC#2, and RLC#3 included in MAC PDU#2 and receive the HARQ ACK feed-back from the receiver side 415. The MAC of the receiver side 415 de-multiplexes MAC PDU#4 to transfer each of the PDUs of RLC#1, RLC#2, and RLC#3 to the corresponding entity.

The data loss may be recovered through operation 460. When an error continuously occurs for the maximum number of HARQ transmission times, the transmitter side 410 collects the data required to be ARQ-retransmitted among the data included in the HARQ transmission to immediately perform data retransmission through the HARQ initial transmission, thereby acquiring an effect of performing the ARQ retransmission immediately when it may be verified that the data loss may not be recovered. That is, in various exemplary embodiments of the present invention, when the receiver side 415 drives the timer and the data transmission error occurs for the maximum number of HARQ transmission times without the need of requesting the ARQ retransmission to the transmitter side 410 at the time when the timer expires, the transmitter side 410 may perform data retransmission through the HARQ initial transmission without the request of the receiver side 415.

Figure 5:
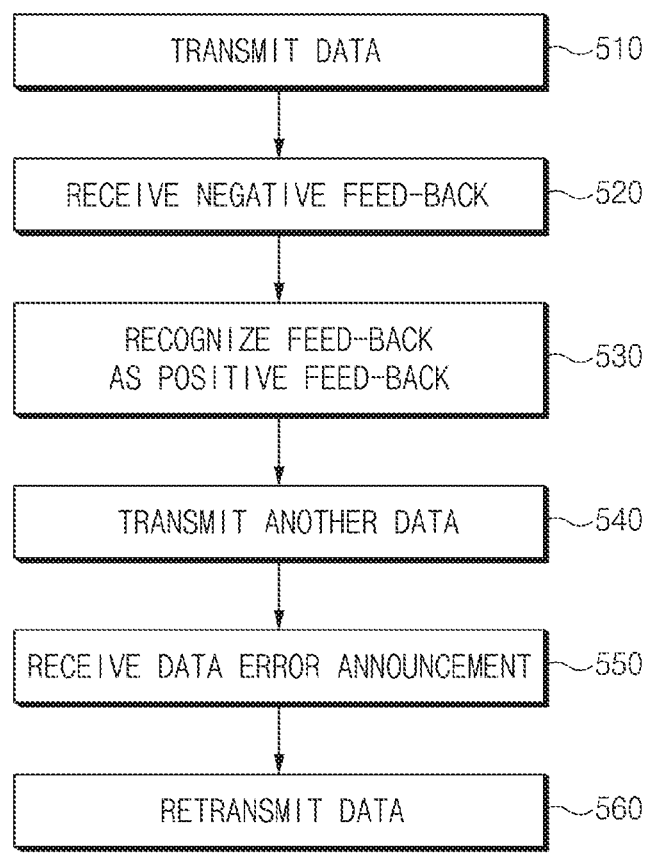
FIG. 5 is a flowchart illustrating a method in which a first electronic device re-transmits data to a second electronic device according to another exemplary embodiment of the present invention.

FIG. 5 is a flowchart illustrating a method in which a first electronic device re-transmits data to a second electronic device according to another exemplary embodiment of the present invention. The method of retransmitting data illustrated in FIG. 5 may be performed by the first electronic device 10 described through FIG. 1 given above. Therefore, even though contents are omitted below, the contents regarding the method in which the first electronic device 10 retransmits the data, which is described through FIG. 1 may be applied even to FIG. 5.

In operation 510, the first electronic device 10 may transmit the data to the second electronic device 20.

In operation 520, the first electronic device 10 may receive a negative feed-back from the second electronic device 20. The negative feed-back may be generated in the second electronic device 20 when the second electronic device 20 may not receive the data transmitted in operation 510 or the second electronic device 20 fails in recovery.

In operation 530, the first electronic device 10 may misinterpret the negative feed-back received in operation 520 as the positive feed-back. That is, in operation 530, a feed-back detection error may occur.

In operation 540, the first electronic device 10 may transmit data other than the data transmitted in operation 510 to the second electronic device 20.

In operation 550, the first electronic device 10 may receive a data error announcement from the second electronic device 20. The reason is that the second electronic device 20 transmits the negative feed-back to the first electronic device 10 in operation 520 and the first electronic device 10 newly transmits data other than the data in which the error occurs in operation 540.

In operation 560, the first electronic device 10 may transmit the data transmitted in operation 510 to the second electronic device 20 again in response to the data error announcement received in operation 550.

Figure 6:
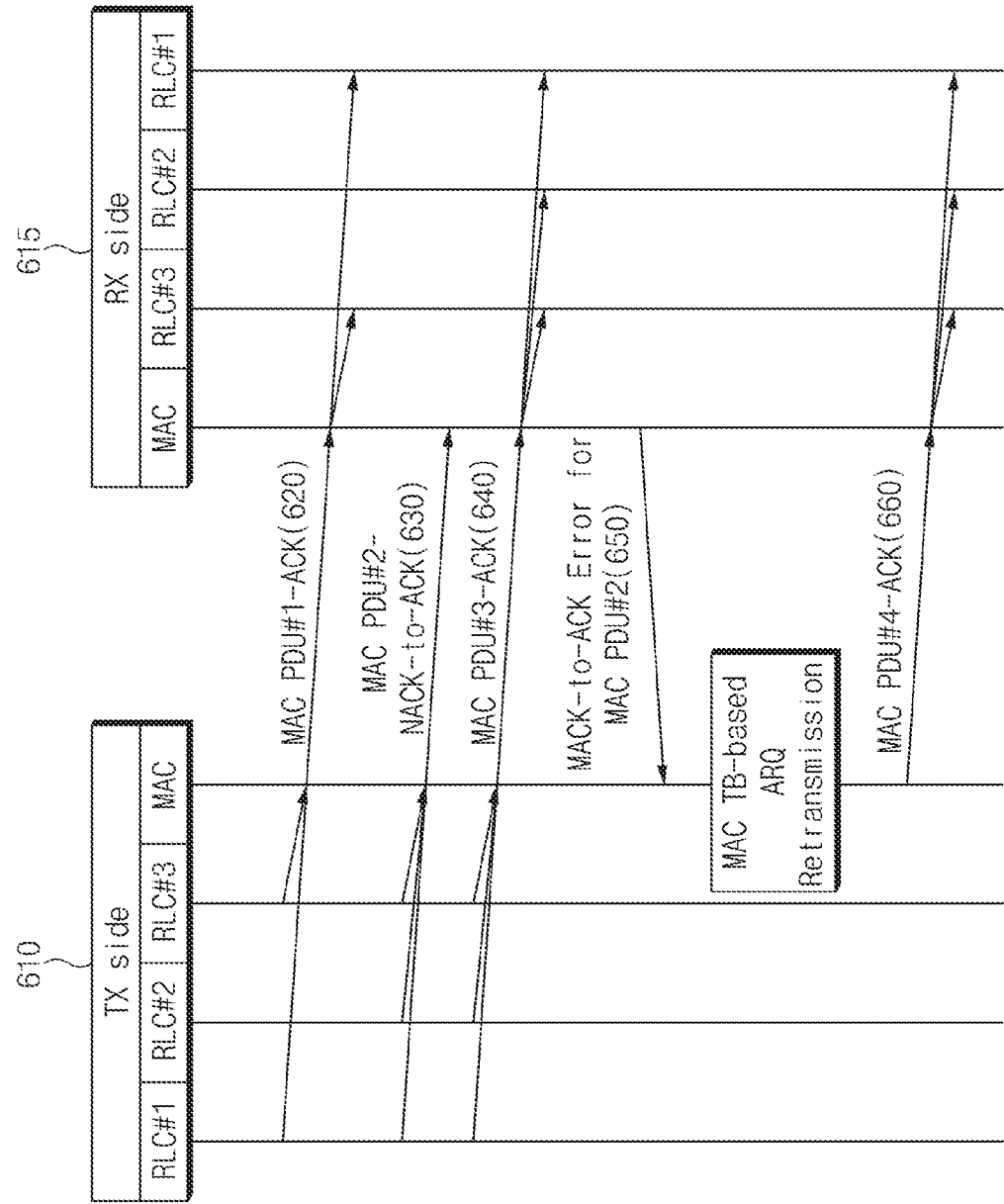
FIG. 6 is a flowchart illustrating a method in which when an NACK-to-ACK error occurs, a second electronic device detects the NACK-to-ACK error and reports the detected error to a first electronic device to collect data required to be ARQ-retransmitted among data included in previously HARQ transmission and perform data retransmission through HARQ initial transmission according to various exemplary embodiments of the present invention.

FIG. 6 is a flowchart illustrating a method in which when an NACK-to-ACK error occurs, a second electronic device detects the NACK-to-ACK error and reports the detected error to a first electronic device to collect data required to be ARQ-retransmitted among data included in previously performed HARQ transmission and perform data retransmission through HARQ initial transmission according to various exemplary embodiments of the present invention. The method of collecting the data required to be ARQ-retransmitted and HARQ-retransmitting the collected data, which is illustrated in FIG. 6 may be performed by the first electronic device 10 described through FIGS. 1 and 5 given above. Therefore, even though contents which are omitted below, contents regarding the method in which the first electronic device 10 collects the data required to be ARQ-retransmitted and retransmits the collected data through the HARQ initial transmission, which is described through FIGS. 1 and 5 may be applied even to FIG. 6.

In FIG. 6, a situation is assumed in which three RLC entities are configured in each of a transmitter side 610 and a receiver side 615.

In operation 620, MAC of the transmitter side 610 transmits to the receiver side 615 MAC PDU#1 obtained by multiplexing the PDUs of RLC#1 and RLC#3 and receives from the receiver side 615 the HARQ ACK feed-back announcing that the data is normally received. MAC of the receiver side 615 de-multiplexes MAC PDU#1 to transfer each of the PDUs of RLC#1 and RLC#3 to the corresponding entity.

In operation 630, the MAC of the transmitter side 610 may transmit to the receiver side 615 MAC PDU#2 obtained by multiplexing the PDUs of RLC#1, RLC#2, and RLC#3 and receive the HARQ NACK feed-back report that the error occurs in the data received from the receiver side 615. However, in various exemplary embodiments of the present invention, a situation (a situation in which the NACK-to-ACK error occurs) is assumed in which the transmitter side 610 misinterprets the HARQ NACK feed-back in the receiver side 615 as the HARQ ACK.

In operation 640, the MAC of the transmitter side 610 may transmit to the receiver side 615 MAC PDU#3 obtained by multiplexing the PDUs of RLC#1, RLC#2, and RLC#3 and receive from the receiver side 615 the HARQ ACK feed-back. The MAC of the receiver side 615 de-multiplexes MAC PDU#3 to transfer each of the PDUs of RLC#1, RLC#2, and RLC#3 to the corresponding entity. In various exemplary embodiments of the present invention, a situation is assumed in which MAC PDU#2 and MAC PDU#3 are transmitted through the same HARQ process.

In operation 650, the receiver side 615 transmits the HARQ NACK feed-back in operation 530 through the same HARQ process and a new PDU is HARQ-transmitted, and as a result, the receiver side 615 may report to the transmitter side 610 that the NACK-to-ACK error occurs. The corresponding entities of RLC#1, RLC#2, and RLC#3 of the receiver side 615 are in a state to discover the data loss, but may not start the timer.

In operation 660, the MAC of the transmitter side 610 that receives that the NACK-to-ACK error occurs with respect to MAC PDU#2 may perform the ARQ retransmission with respect to PDUs required to be ARQ-retransmitted among RLC PDUs included in MAC PDU#2 at once. For example, all of the entities of RLC#1, RLC#2, and RLC#3 require the ARQ retransmission, the transmitter side 610 may transmit to the receiver side 615 MAC PDU#4 obtained by multiplexing the RLC PDUs of the entities of RLC#1, RLC#2, and RLC#3 included in MAC PDU#2 and receive the HARQ ACK feed-back from the receiver side 615. The MAC of the receiver side 615 de-multiplexes MAC PDU#4 to transfer each of the PDUs of RLC#1, RLC#2, and RLC#3 to the corresponding entity.

The data loss may be recovered through operation 660.

Through operation 660, when the NACK-to-ACK error occurs, the receiver side 615 detects the NACK-to-ACK error and reports the detected NACK-to-ACK error to the transmitter side 610 and when the NACK-to-ACK error occurs, the data required to be ARQ-retransmitted among the data included in the previous HARQ transmission are collected to be immediately HARQ-transmitted, thereby acquiring an effect of performing the ARQ retransmission immediately when it is verified that the data loss may not be recovered. That is, in various exemplary embodiments of the present invention, when the receiver side 415 drives the timer and the NACK-to-ACK error occurs without the need of requesting the ARQ retransmission to the transmitter side 410 at the time when the timer expires, the transmitter side 410 may perform the HARQ transmission without the request of the receiver side 415.

Various exemplary embodiments of the present invention may include a retransmission method of performing the HARQ transmission by collecting the data required to be retransmitted when the ARQ retransmission is required according to the HARQ transmission result in the mobile communication system.

In various exemplary embodiments of the present invention, the case where the ARQ retransmission is required according to the HARQ transmission result may include the case where the HARQ NACK is fed back with respect to the transmission for the maximum number of HARQ transmission times and the case where the NACK-to-ACK error occurrence is reported from the receiver side.

Various exemplary embodiments of the present invention may include a retransmission method in which the transmitter side immediately performs the HARQ transmission by collecting the data required to be ARQ-retransmitted among the data included in the HARQ transmission when the HARQ NACK is fed back with respect to the transmission for the maximum number of HARQ transmission times.

Various exemplary embodiments of the present invention may include a retransmission method in which when the NACK-to-ACK error occurs, the receiver side detects the NACK-to-ACK error and reports the detected NACK-to-ACK error to the transmitter side and the transmitter side that receives the report immediately performs the HARQ transmission by collecting the data required to be ARQ-retransmitted among the data included in the previous HARQ transmission.

Various exemplary embodiments of the present invention may include a retransmission method of when both the method and the ARQ retransmission operate, in the case where the retransmission is performed by the HARQ transmission at the transmitter side, announcing that the retransmission is performed by announcing to the ARQ entity that the retransmission is performed.

Figure 7:
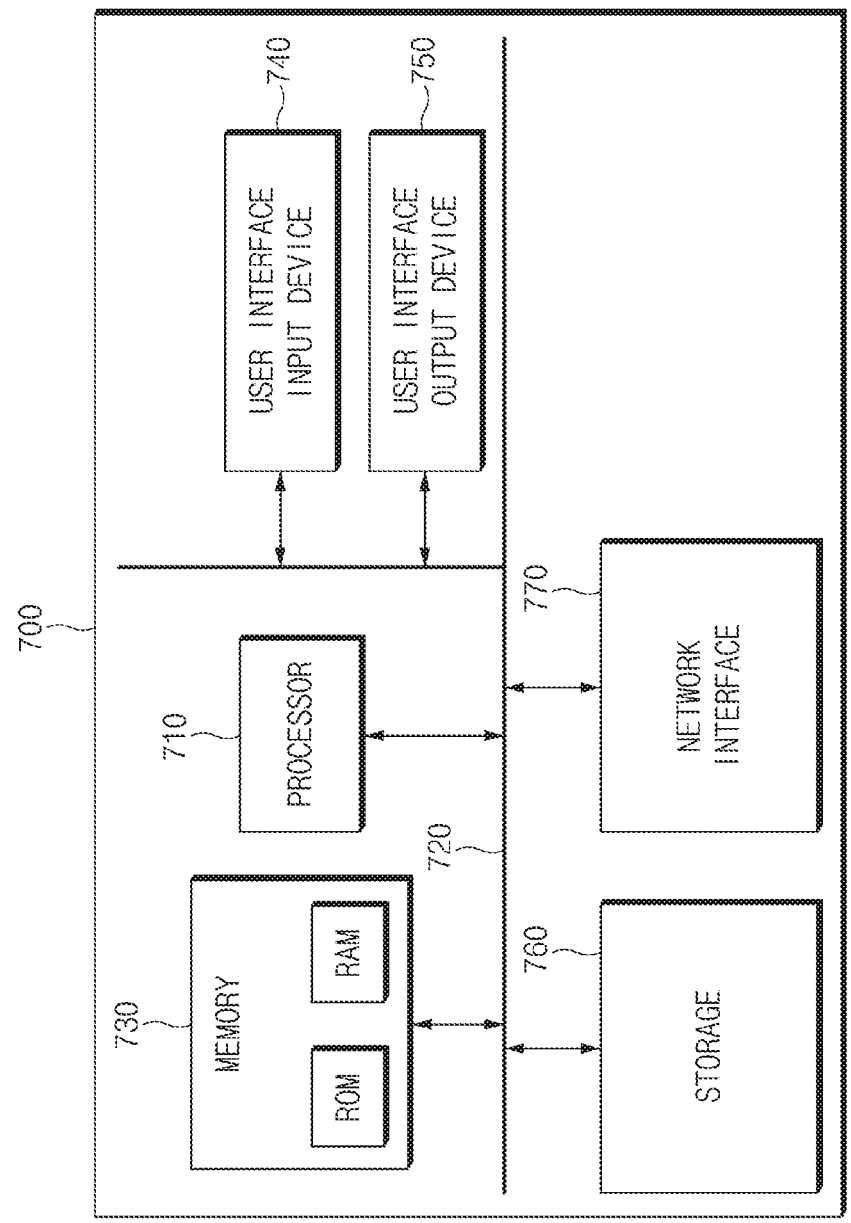
FIG. 7 is a configuration diagram of a first electronic device according to another exemplary embodiment of the present invention.

FIG. 7 is a configuration diagram of a first electronic device according to another exemplary embodiment of the present invention.

Referring to FIG. 7, a computing system 700 may include at least one processor 710, a bus 720a memory 730, a user interface input device 740, a user interface output device 750, a storage 760, and a network interface 770 connected through a bus 720.

The processor 710 may be a central processing unit (CPU) or a semiconductor device that executes processing of commands stored in the memory 730 and/or the storage 760. The memory 730 and the storage 760 may include various types of volatile or non-volatile storage media. For example, the memory 730 may include a read only memory (ROM) and a random access memory (RAM).

Therefore, steps of a method or an algorithm described in association with the exemplary embodiments disclosed in the specification may be directly implemented by hardware and software modules executed by the processor 710, or a combination thereof. The software module may reside in storage media (that is, the memory 730 and/or the storage 760) such as a RAM memory, a flash memory, a ROM memory, an EPROM memory, an EEPROM memory, a register, a hard disk, a removable disk, and a CD-ROM. The exemplary storage medium is coupled to the processor 710 and the processor 710 may read information from the storage medium and write the information in the storage medium. As another method, the storage medium may be integrated with the processor 710. The processor and the storage medium may reside in an application specific integrated circuit (ASIC). The ASIC may reside in a user terminal. As yet another method, the processor and the storage medium may reside in the user terminal as individual components.

The specified matters and limited embodiments and drawings such as specific components in the present invention have been disclosed for illustrative purposes, but are not limited thereto, and those skilled in the art will appreciate that various modifications and changes can be made in the art to which the present invention belongs, within the scope without departing from an essential characteristic of the present invention.

The spirit of the present invention should not be defined only by the described exemplary embodiments, and it should be appreciated that and claims to be described below and all technical spirits which evenly or equivalently modified are included in the claims of the present invention.

What is claimed is:

1. A first electronic device comprising:
a transmitter transmitting first data to a second electronic device;
a receiver receiving a first feed-back for the first data from the second electronic device; and
a processor deciding whether to transmit the first data again or other data to the second electronic device, based on the first feed-back, wherein
when the first feed-back is a negative feed-back,
the transmitter retransmits the first data under a predetermined condition, and
the receiver receives a second feed-back with respect to the retransmitted first data from the second electronic device, and
when the second feed-back is the negative feed-back as many as a maximum number of retransmission times,
the processor identifies at least one radio link control (RLC) protocol data unit (PDU) which is required to be automatic repeat request (ARQ)-retransmitted among RLC PDUs included in the first data based on the second feed-back, and generates a medium access control (MAC) PDU including the identified at least one RLC PDU, and
the transmitter re-retransmits new data including the generated MAC PDU to the second electronic device.

2. The electronic device of claim 1, wherein the second electronic device does not start an ARQ retransmission timer based on the first feed-back.

3. The electronic device of claim 1, wherein when the receiver receives the negative feed-back for the case of retransmitting the first data at a number of times less than the maximum number of retransmission times, the processor HARQ-retransmits the first data to the second electronic device.

4. The electronic device of claim 1, wherein the first data includes a plurality of RLC PDUs, and
one or more RLC PDUs receiving the negative feed-back among the transmitted first data or the retransmitted first data are targets of the data retransmission.

5. The electronic device of claim 1, wherein when the received first feedback is the negative feed-back and the processor misinterprets the first feed-back,
the transmitter transmits the other data to the second electronic device, and
the receiver receives a data transmission error announcement from the second electronic device.

6. The electronic device of claim 5, wherein in response to the data transmission error announcement, the transmitter ARQ-retransmits the new data through a HARQ initial transmission.

7. The electronic device of claim 6, wherein the second electronic device does not start the ARQ retransmission timer based on the data transmission error announcement.

8. A method performed by a first electronic device, the method comprising:
an operation of transmitting first data to a second electronic device;
an operation of receiving a first feed-back for the transmitted first data from the second electronic device;
an operation of deciding whether to transmit the first data again or other data to the second electronic device, based on the first feed-back;
an operation of retransmitting the first data under a predetermined condition when the first feed-back is a negative feed-back;
an operation of receiving a second feed-back with respect to the retransmitted first data from the second electronic device;
an operation of identifying at least one RLC PDU which is required to be ARQ-retransmitted among RLC PDUs included in the first data based on the second feed-back, when the second feed-back is the negative feed-back as many as a maximum number of retransmission times;
an operation of generating MAC PDU including the identified at least one RLC PDU; and
an operation of re-retransmitting new data including the generated MAC PDU to the second electronic device.

9. The method of claim 8, further comprising:
an operation of misinterpreting the received first negative feed-back as the first feed-back;
an operation of transmitting the other data to the second electronic device;
an operation of receiving a data transmission error announcement from the second electronic device; and
an operation of retransmitting the new data in response to the data transmission error announcement.

* * * * *